(12) United States Patent
Buckler et al.

(10) Patent No.: US 10,735,675 B2
(45) Date of Patent: Aug. 4, 2020

(54) CONFIGURABLE IMAGE PROCESSING SYSTEM AND METHODS FOR OPERATING A CONFIGURABLE IMAGE PROCESSING SYSTEM FOR MULTIPLE APPLICATIONS

(71) Applicant: Cornell University, Ithaca, NY (US)

(72) Inventors: Mark Buckler, Ithaca, NY (US); Adrian Sampson, Trumansburg, NY (US); Suren Jayasuriya, Tempe, AR (US)

(73) Assignee: Cornell University, Ithaca, NY (US)

( * ) Notice: Subject to any disclaimer, the term of this patent is extended or adjusted under 35 U.S.C. 154(b) by 182 days.

(21) Appl. No.: 15/952,719

(22) Filed: Apr. 13, 2018

(65) Prior Publication Data

US 2019/0320127 A1 Oct. 17, 2019

(51) Int. Cl.
*H04N 5/343* (2011.01)
*H04N 5/378* (2011.01)
*H04N 5/345* (2011.01)
*H04N 5/369* (2011.01)

(52) U.S. Cl.
CPC .......... *H04N 5/343* (2013.01); *H04N 5/3456* (2013.01); *H04N 5/378* (2013.01); *H04N 5/3698* (2013.01)

(58) Field of Classification Search
CPC .... H04N 5/343; H04N 5/3698; H04N 5/3456; H04N 5/378
See application file for complete search history.

(56) References Cited

U.S. PATENT DOCUMENTS 9,621,741 B2 * 4/2017 Caviedes ........... H04N 1/00204

OTHER PUBLICATIONS

Apple Inc., "AVCapture Photo Output" Retrieved from URL: https://developer.apple.com/reference/avfoundation/avcapturephotooutput on Jun. 20, 2019, 7 pages.
Borer, David, et al. "Large-scale Particle Tracking with Dynamic Vision Sensors" The 16th International Symposium on Flow Visualization (ISFV), 2014.
Centeye, Inc. "Logarithmic Pixels" Retrieved from URL: http://www.centeye.com/technology/47-2/ on Jun. 20, 2019, 4 pages.
Chakrabarti, Ayan. "Learning Sensor Multiplexing Design through Back-propagation" 30th Conference on Neural Information Processing Systems (NIPS 2016), 9 pages.
Chen, Huaijin G., et al. "ASP Vision: Optically Computing the First Layer of Convolutional Neural Networks using Angle Sensitive Pixels" In Conference on Computer Vision and Pattern Recognition (CVPR), 2016, 10 pages.

(Continued)

*Primary Examiner* — Twyler L Haskins
*Assistant Examiner* — Angel L Garces-Rivera
(74) *Attorney, Agent, or Firm* — McDermott Will & Emery LLP

(57) ABSTRACT

A configurable image processing system can process image data for multiple applications by including an image sensor capable of operating in a machine vision mode and a photography mode in response to an operating system command. When operating in machine vision mode, the image sensor may send image data to first processor for machine vision processing. When operating in photography mode, the image sensor may send image data to an image coprocessor for photography processing.

16 Claims, 7 Drawing Sheets

(56) References Cited

OTHER PUBLICATIONS

Chen, Yu-Hsin, et al. "Eyeriss: An Energy-Efficient Reconfigurable Accelerator for Deep Convolutional Neural Networks" IEEE Journal of Solid-State Circuits, vol. 52, No. 1, pp. 127-138, Nov. 8, 2016.

Chen, Xiang, et al. "How is Energy Consumed in Smartphone Display Applications?" In Proceedings of the 14th Workshop on Mobile Computing Systems and Applications, Feb. 26-27, 2013, 6 pages.

Clapp, Matthew A., et al. "Focal-Plane Analog Image Processing" In CMOS Imagers, Springer, Boston, pp. 141-202, 2004.

Diamond, Steven, et al. "Dirty Pixels: Optimizing Image Classification Architectures for Raw Sensor Data" arXiv preprint arXiv:1701.06487 11 pages, Jan. 23, 2017.

Donoho, David L. "Compressed Sensing" IEEE Transactions on information theory, vol. 52, No. 4, pp. 1289-1306, Apr. 1, 2006.

Du, Zidong, et al. "ShiDianNao: Shifting Vision Processing Closer to the Sensor" In ACM SIGARCH Computer Architecture News, vol. 43, No. 3, pp. 92-104, Jun. 13, 2015.

Duhamel, Pierre-Emile J., et al. "Biologically Inspired Optical-Flow Sensing for Altitude Control of Flapping-Wing Microrobots" IEEE/ASME Trasactions on Mechatronics, vol. 18, No. 2, pp. 556-568, Apr. 2013.

Han, Song, et al. "EIE: Efficient Inference Engine on Compressed Deep Neural Network" 2016 ACM/IEEE 43rd Annual International Symposium on Computer Architecture, pp. 243-254, Jun. 18, 2016.

Han, Seungyeop, et al. "GlimpseData: Towards Continuous Vision-Based Personal Analytics" In Proceedings of the 2014 Workshop on Physical Analytics, pp. 31-36, Jun. 11, 2014.

Hegarty, James, et al. "Darkroom: Compiling High-Level Image Processing Code into Hardware Pipelines" ACM Trans. Graph. vol. 33, No. 4, Jul. 1, 2014, 11 pages.

Hegarty, James, et al. "Rigel: Flexible Multi-Rate Image Processing Hardware" ACM Transactions on Graphics (TOG), vol. 35, No. 4, Jul. 11, 2016, 11 pages.

Inilabs Ltd. "Dynamic Vision Sensor" Retrieved from URL: https://inilabs.com/products/dynamic-vision-sensors/ Jul. 29, 2015, 6 pages.

Likamwa, Robert, et al. "Energy Characterization and Optimization of Image Sensing Toward Continuous Mobile Vision" In Proceeding of the 11th annual international conference on Mobile systems, applications, and services, Jun. 26, 2013, 13 pages.

Likamwa, Robert, et al. "RedEye: Analog ConvNet Image Sensor Architecture for Continuous Mobile Vision" In ACM SIGARCH Computer Architecture News, vol. 44, No. 3, pp. 255-266, Jun. 18, 2016.

Liu Z., et al. "Ultra-low-power image signal processor for smart camera applications" Electronics Letters, vol. 51, No. 22, pp. 1778-1780, Oct. 22, 2015.

Omid-Zohoor, Alex, et al. "Toward Always-On Mobile Object Detection: Energy Versus Performance Tradeoffs for Embedded HOG Feature Extraction" IEEE Transactions on Circuits and Systems for Video Technology, vol. 28, No. 5, pp. 1102-1115, May 2008.

Massari, Nicola, et al. "A CMOS Image Sensor With Programmable Pixel-Level Analog Processing", IEEE Transactions on Neural Networks, vol. 16, No. 6, pp. 1673-1684, Nov. 2005.

Reagen, Brandon, et al. "Minerva: Enabling Low-Power, Highly-Accurate Deep Neural Network Accelerators" In 2016 ACM/IEEE 43rd Annual International Symposium on Computer Architecture (ISCA), Jun. 18, 2016 (pp. 267-278).

Richards, W. A. "Lightness scale from image intensity distributions" Applied Optics, vol. 21, No. 14, pp. 2569-2582, Jul. 15, 1982.

Vasilyev, Artem, et al. "Evaluating Programmable Architectures for Imaging and Vision Applications" In 2016 49th Annual IEEE/ACM International Symposium on Microarchitecture (MICRO) Oct. 15, 2016 (pp. 1-13).

\* cited by examiner

CONFIGURABLE IMAGE PROCESSING SYSTEM AND METHODS FOR OPERATING A CONFIGURABLE IMAGE PROCESSING SYSTEM FOR MULTIPLE APPLICATIONS

BACKGROUND

Developments in the field of deep learning have facilitated progress in a plethora of tasks related to computer vision. To implement these computer vision advancements on devices with relatively low battery budgets, such as smartphones, recent work has focused on designing custom hardware for inference in deep neural networks. Embedded image processing systems for computer vision typically involve an entire imaging pipeline, from detecting photons to obtaining a task result. Existing image processing system pipelines are designed to produce high-quality images for human consumption. A typical image system pipeline consists of an image sensor and an image signal processor chip, both of which are hardwired to produce high-resolution, low-noise, color corrected photographs. As advancements in computer vision hardware reduces the energy cost of inference, the cost to capture and process images consumes a larger share of total system power.

SUMMARY

At least one aspect is directed towards a configurable imaging processing system. The configurable imaging processing system includes at least one image sensor configured to operate in a machine vision mode and a photography mode in response to an operating system command. When operating in machine vision mode, the at least one image sensor is configured to send image data to a first processor. When operating in photography mode, the at least one image sensor is configured to send image data to an image coprocessor.

The image sensor can include a plurality of subpixel columns. Each subpixel column in the plurality of subpixel columns can include a plurality of subpixels, at least one analog-to-digital converter, at least one amplifier, and at least one switch. The at least one analog-to-digital converter can be a successive approximation analog-to-digital converter. When operating in photography mode, the at least one image sensor can further be configured to operate in a higher resolution mode. When operating in photography mode, the at least one image sensor can be further configured to digitize input image data by performing linear quantization. When operating in machine vision mode, the at least one image sensor can further be configured to operate in a lower resolution mode. When operating in machine vision mode, the at least one image sensor can further be configured to digitize input image data by performing nonlinear quantization. Performing nonlinear quantization can include performing logarithmic quantization. When operating in machine vision mode, the at least one image sensor can be further configured to perform approximate demosaicing. Performing approximate demosaicing can include subsampling the input image data. The image coprocessor can be configured to perform demosaicing, denoising, color mapping, tone mapping, and compression, or a combination thereof. The first processor can be an artificial intelligence processor or a central processing unit.

Another aspect is directed towards a method for operating a configurable image processing system for multiple applications. The method includes receiving, by an image sensor, instructions to operate in either a photography mode or a machine vision mode. In response to receiving instructions to operate in a photography mode, the method includes capturing, by the image sensor, image data and sending the image data to an image coprocessor for image processing. In response to receiving instructions to operate in a machine vision mode, the method includes capturing, by the image sensor, image data and sending the image data to a first processor for image processing.

The image sensor may digitize the image data using linear quantization in response to receiving instructions to operate in a photography mode. The image sensor can digitize the image data using logarithmic quantization in response to receiving instructions to operate in a machine vision mode. The image sensor may execute approximate demosaicing on the image data in response to receiving instructions to operate in a machine vision mode. Executing approximate demosaicing may include subsampling the image data. The image sensor may capture image data at a lower resolution in response to receiving instructions to operate in a machine vision mode and also capture image data at a higher resolution in response to receiving instructions to operate in a photography mode.

Another aspect is directed towards a method for operating a configurable image processing system for multiple applications. The method includes determining, by an operating system executing on a first processor, whether an image capture application executing on the processor comprises a photography application or a machine vision application. In response to determining that the image capture application is a photography application, the method includes sending, by the operating system, a photography mode control signal to an image sensor controller. In response to determining that the image capture application is a photography application, the method further includes receiving, by the operating system, image data from an image coprocessor after the image coprocessor has processed image data captured by the image sensor in response to receiving the photography mode control signal. In response to determining that the image capture application comprises a machine vision application, the method includes sending, by the operating system, a machine vision mode control signal to the image sensor controller. In response to determining that the image capture application comprises a machine vision application, the method further includes receiving, by the operating system, image data captured by the image sensor in response to the machine vision control mode signal without such image data being processed by the image co-processor.

In response to determining that the image capture application comprises a machine vision application, the operating system may send a power-down control signal to the image coprocessor. In response to determining that the image capture application comprises a machine vision application, the operating system may send the received image data to an artificial intelligence coprocessor. In response to determining that the image capture application is a machine vision application, the operating system may pass the received image data to the machine vision application. The received image data captured in response to determining that the application is a machine vision application may be lower resolution image data than the image data captured in response to determining that the application is a photography application. The image data received in response to determining that the application is a machine vision application may be non-linearly quantized image data. The image data received in response to determining that the application is a photography application may be linearly quantized image data.

Another aspect is directed towards a computer-readable medium which includes instructions for an image capture application. When executed by a processor comprising an operating system, the computer-readable medium causes the operating system to determine whether the image capture application executing on the processor comprises a photography application or a machine vision application. If the operating system determines that the image capture application is a photography application, the computer-readable medium causes the operating system to send a photography mode control signal to an image sensor controller, and receive image data from an image coprocessor after the image coprocessor has processed image data captured by the image sensor in response to receiving the photography mode control signal. If the operating system determines that the image capture application is a machine vision application, the computer-readable medium causes the operating system to send a machine vision mode control signal to the image sensor controller, and receive image data captured by the image sensor in response to the machine vision control mode signal without such image data being processed by the image coprocessor.

In response to determining that the image capture application is a machine vision application, the operating system may send a power-down control signal to the image coprocessor. In response to determining that the image capture application is a machine vision application, the operating system may send the received image data to an artificial intelligence coprocessor. In response to determining that the image capture application is a machine vision application, the operating system may pass the received image data to the machine vision application. The image data received by the operating system in response to determining the application is a machine vision application may include lower resolution image data than the image data received by the operating system in response to determining that the application is a photography application. The image data received by the operating system in response to determining that the application is a machine vision application may be non-linearly quantized image data, while the image data received by the operating system in response to determining that the application is a photography application may be linearly quantized image data.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Recent developments in the field of deep learning have facilitated progress in a plethora of tasks related to computer vision. To implement these computer vision advancements on devices with relatively low battery budgets, such as smartphones, recent work has focused on designing custom hardware for inference in deep neural networks. For instance, recent work has focused on dedicated ASICs for deep learning to reduce the cost of forward inference compared to a GPU or CPU. Embedded computer vision systems typically involve an entire imaging pipeline, from photon detection to obtaining a task result. Existing imaging pipelines are designed to produce high-quality images for human consumption. For example, a typical image pipeline consists of an image sensor and an image signal processor chip, both of which are hardwired to produce high-resolution, low-noise, color corrected photographs. As hardware acceleration reduces the energy cost of inference, the cost to capture and process images consumes a larger share of total system power. Accordingly, recent work on custom hardware design for inference in deep neural networks only address part of the whole cost of machine vision.

Opportunities exist to reduce power consumption while increasing processing speed by configuring the image pipeline for more efficient image processing. For instance, modern computer vision applications do not require the same level of image quality desired for human consumption of images. Therefore, most mainstream, photography-orienting imaging hardware wastes time and energy by providing high quality images that computer vision algorithms do not need. For instance, most commercial image processors used in digital cameras produce high quality compressed images by performing demosaicing, denoising, color mapping, gamut mapping, tone mapping, and gamma compression. However, only some of these image processing techniques may have a substantial impact on computer vision accuracy. To address this problem, some mainstream cameras, including smartphones, can bypass the image signal processor altogether. However, configuring the image processing system to not perform any of these techniques may have a substantial negative impact on computer vision accuracy. Other work has focused on configuring image processing systems specifically for computer vision applications. However, it may be preferable for devices such as smartphones to have the flexibility to produce both higher quality images for human consumption and lower quality images for machine vision applications. In doing so, the camera can be configured to save power when processing images for computer vision applications.

Figure 1:
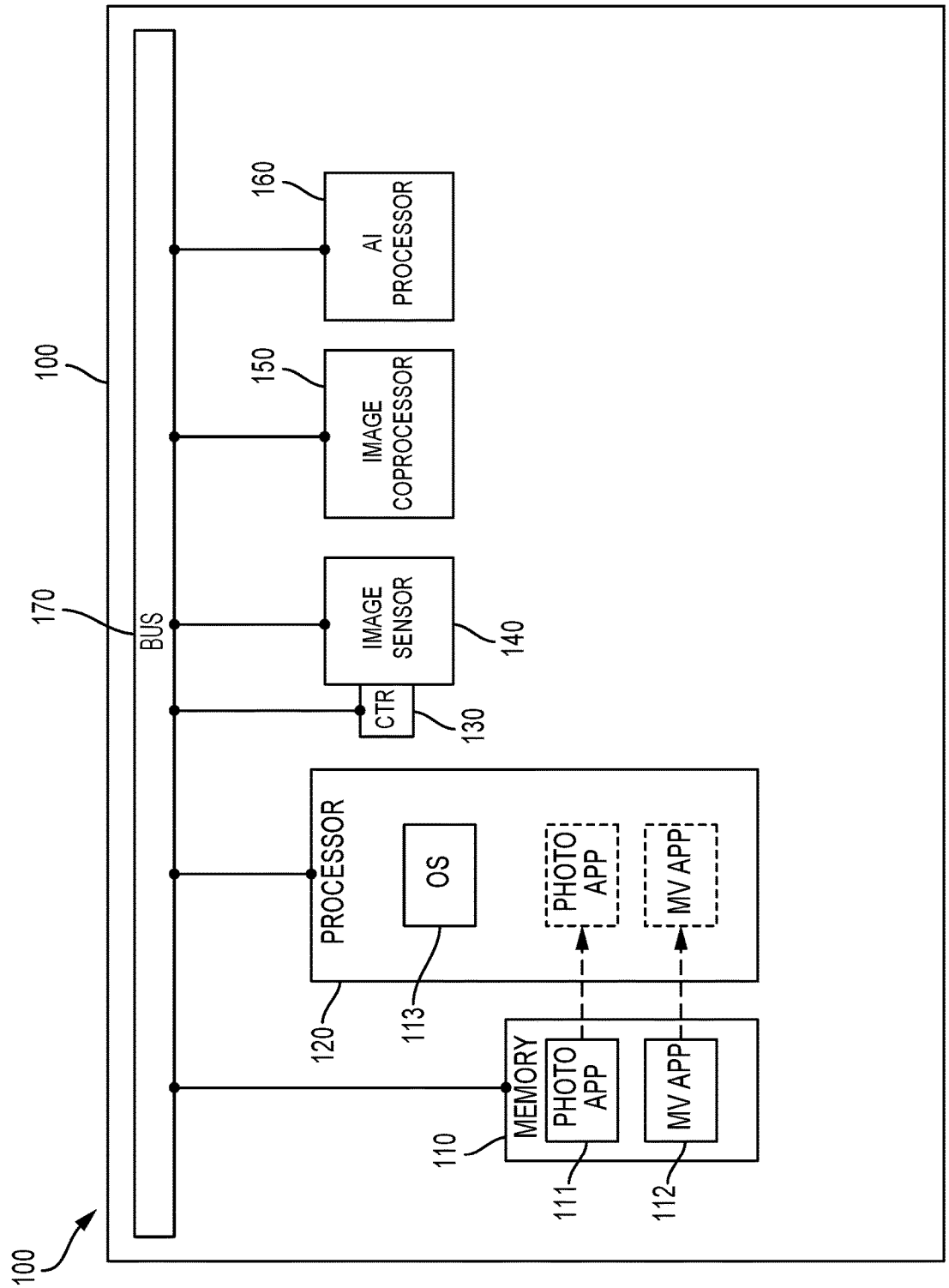
FIG. 1 is a diagram of a configurable image processing system according to exemplary implementations of the present disclosure

FIG. 1 is a diagram of a configurable image processing system according to exemplary implementations of the present disclosure. The configurable image processing system 100 includes a memory unit 110, a processor 120, a controller 130, an image sensor 140, an image coprocessor 150, and an artificial intelligence (AI) processor 160. These components may be connected to one another via a system bus 170. The processor 120 is a graphics processing unit (GPU). The processor 120 is configured to execute an operating system 113, a machine vision application 112, and a photography application 111. The machine vision application 112 and the photography application 111 are stored in the memory unit 110. The processor 120 is configured to store and execute the machine vision application 112 and the photography application 111 based on commands from the operating system 113.

The image sensor 140 is communicatively coupled to a controller 130 and is configured to operate in a machine vision mode and a photography mode based on commands sent from operating system 113 to the controller 130. In some implementations, the image sensor 140 includes the controller 130. The controller 130 is configured to send control signals to various components of the image sensor 140. In some implementations, the controller 130 includes one or more registers or other memory units for storing image data. In some implementations, the controller 130 configures the data for further processing. When the processor 120 is executing the photography application 111, the operating system 113 sends commands to the image sensor 140 to operate in photography mode through the controller 130. When operating in photography mode, the image sensor 140 operates at a first resolution. On the other hand, when the processor 120 is executing the machine vision application, the operating system sends commands to the image sensor 140 to operate in machine vision mode. When operating in machine vision mode, the image sensor 140 may operate at a second resolution. In some implementations, the first resolution is a higher resolution than the second resolution.

Furthermore, when operating in photography mode, the image sensor 140 may be configured to process an input image to obtain a raw data output and send the raw data output to the image coprocessor 150 for further processing. While operating in machine vision mode, the image sensor 140 may be configured to process an input image to obtain raw data output and send the raw data output back to the processor 120 for further processing. Alternatively, the image sensor 140 may be configured to send the raw data output directly to the AI processor 160 for processing or to the memory unit 110 for storage.

In some implementations, the image sensor 140 includes a plurality of subpixels. The plurality of subpixels may be arranged into a plurality of subpixel rows and a plurality of subpixel columns. For example, a 32×32 subpixel array includes 32 subpixel columns and 32 subpixel rows making up a total of 1024 subpixels. In further implementations, each column of subpixels further includes an amplifier, an analog-to-digital converter ("ADC"), and a switch. The switch is a transistor, but may also be other switch devices. In some implementations, the analog-to-digital converter is a successive-approximation-register (SAR) ADC. Other types of ADCs however may be used. For example, in some implementations, the ADC is a sigma-delta ADC. In other implementations, the ADC is a pipeline ADC. The ADC may also be a flash ADC. The ADC is configured to perform linear quantization and nonlinear quantization depending on the image sensor's operational mode. However, subpixel columns can be configured in other arrangements. For example, in some implementations, two columns are connected to a single ADC, a single switch and a single amplifier. In some implementations each subpixel column includes two ADCs. In this instance one ADC performs linear quantization and the other performs nonlinear quantization.

Furthermore, in some implementations, the image sensor 140 is configured to perform approximate demosaicing. In this case, the image sensor is configured to subsample input image data. Subsampling is further discussed in the description of FIG. 3B.

In some implementations, the image coprocessor 150 is a commercial image processing chip known in the art. The image coprocessor 150 may be further configured to perform demosaicing, denoising, color mapping, tone mapping, and compression, or a combination thereof, when processing the raw data output to obtain a processed data output.

Figure 2A:
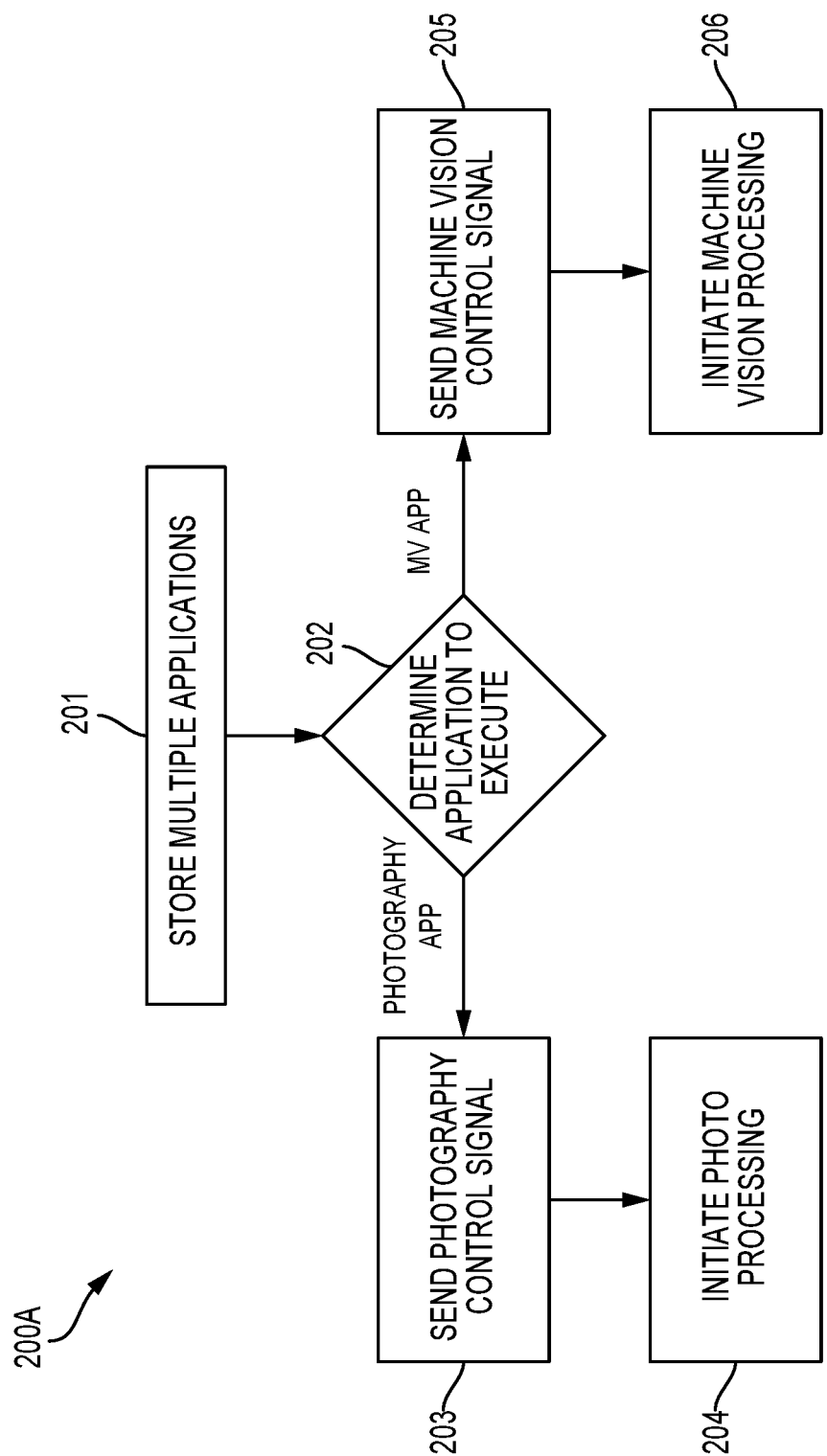
FIG. 2A is a flow diagram of a method for operating a configurable image processing system for multiple applications according to exemplary implementations of the present disclosure.
Figure 2B:
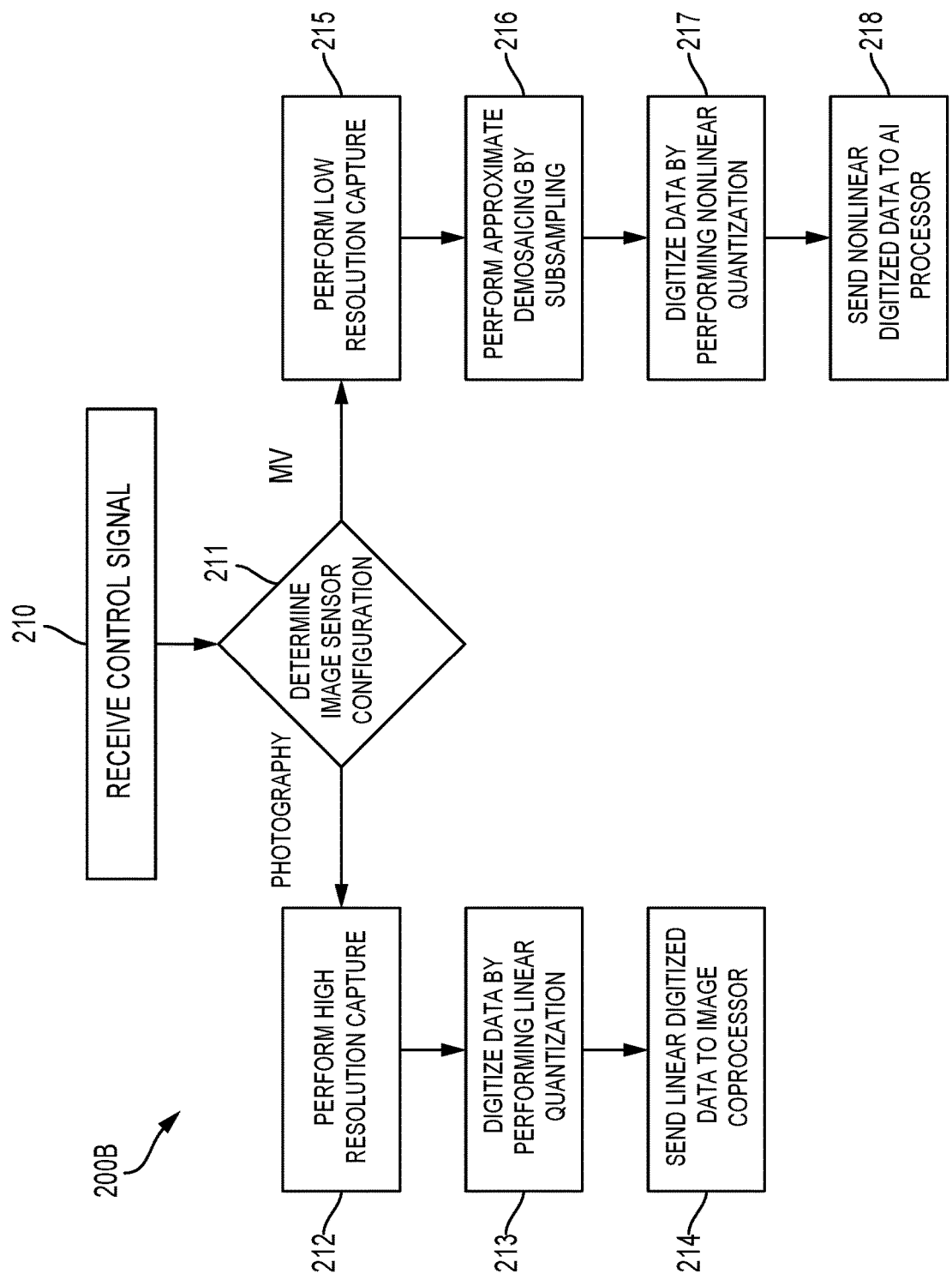
FIG. 2B is a flow diagram of a method for operating a configurable image processing system for multiple applications according to exemplary implementations of the present disclosure

FIG. 2A and FIG. 2B are flow diagrams depicting examples of a method for operating a configurable image processing system for multiple applications according to exemplary implementations of the present disclosure. FIG. 2A shows an example of a method for operating a configurable image processing system for multiple applications from an operating system perspective. Referring to FIG. 2A, the method for operating a configurable image processing system for multiple applications 200A includes storing multiple applications (Step 201) and determining an application to execute (step 202). If the operating system determines to execute a photography application, the operating system sends a photography mode control signal (step 203) and initiates photography processing (step 204). If the operating system determines to execute a machine vision application, it sends a machine vision mode control signal (step 205), and initiates machine vision processing (step 206).

In some implementations, storing multiple applications (step 201) includes storing computer readable instructions for a photography application and a machine vision application in a processor. The processor, photography application, and machine vision application may be the processor 120, photography application 111, and the machine vision application 112 of FIG. 1.

Determining an application to execute (step 202) includes receiving a command to execute either the machine vision application or the photography application. The command can come from a user through a user interface. For example, a user using a graphical user interface (GUI) can command the operating system to cause the processor to execute either the photography application or the machine vision application. When the operating system receives a command to execute the photography application, the operating system causes the processor to execute the photography application and the operating system sends a photography mode control signal (step 203) and initiates photography processing (step 204). On the other hand, when the operating system receives a command to execute the machine vision application, the operating system causes the processor to execute the machine vision application and sends a machine vision mode control signal (step 205) and initiates machine vision processing (206). The processor may also be executing one, or both, applications in a background state. In this instance, if the selected application is executing in a background state, receiving a command to execute an application includes commanding the operating system to execute the selected application in a foreground state. For example, if the processor is executing the photography application in a background state, the operating system will cause the processor to execute the photography application in a foreground state when the operating system receives a photography command. On the other hand, if the processor is executing the machine vision application in background state, the operating system will cause the processor to execute the machine vision application in a foreground state when the operating system receives a machine vision command.

Sending a photography mode control signal (step 203) includes sending a photography mode control signal to a controller, which is communicatively coupled to, or integrated with, an image sensor. The controller and the image sensor can be the controller 130 and image sensor 140 of FIG. 1. While the processor executes the photography application, the operating system sends a photography mode control signal to the controller, which causes the controller to configure the image sensor to operate in photography mode. In some implementations, causing the image sensor to operate in photography mode includes causing the image sensor to capture image data at a higher resolution. In some implementations, the controller also causes the image sensor to digitize image data by performing linear quantization.

Initiating photography processing (Step 204) includes causing the linear digitized image data to undergo photography processing. When the processor is executing the photography application, the operating system controls the image sensor through the controller to send the linear digitized image data to an image coprocessor. The image coprocessor can be the image coprocessor 150 of FIG. 1. In some implementations, when the image coprocessor receives the linear digitized image data, the image coprocessor performs demosaicing, denoising, color mapping, tone mapping, and compression, or a combination thereof.

Sending a machine vision mode control signal (step 205) includes sending a machine vision mode control signal to the image sensor controller. While the processor executes the machine vision application, the operating system sends a machine vision mode control signal to the controller, which then configures the image sensor to operate in machine vision mode. In some implementations, causing the image sensor to operate in machine vision mode includes causing the image sensor to capture image data at a lower resolution. In some implementations, causing the image sensor to operate in machine vision mode further includes configuring the image sensor to perform approximate demosaicing by subsampling input image data. In some implementations, causing the image sensor to operate in machine vision mode includes causing the image sensor to digitize image data by performing nonlinear quantization. Performing nonlinear quantization may include performing logarithmic quantization.

Initiating machine vision processing (step 206) includes causing the nonlinear digitized image data to undergo machine vision processing. When the processor is executing the machine vision application, the operating system causes the image sensor to send the nonlinear digitized image data to the processor for machine vision processing. In some implementations, the operating system causes the image sensor to send the nonlinear digitized data to an AI processor, such as AI processor 160 of FIG. 1. In further implementations, when the processor (or AI processor) receives the nonlinear digitized data, the processor is configured to perform approximate demosaicing. Note that, in implementations in which the processor is configured to perform approximate demosaicing, the image sensor is not performing approximate demosaicing. Approximate demosaicing may include subsampling the digitized data or averaging portions of the nonlinear digitized data. An example of approximate demosaicing is discussed later in the description of FIG. 3B.

FIG. 2B illustrates a method for operating a configurable image processing system for multiple applications from an image sensor perspective. The method for operating a configurable image processing system for multiple applications 200B includes receiving a control signal (step 210) and determining an image sensor configuration (211). If the control signal is determined to be a photography mode control signal, the image sensor performs high resolution capture (step 212), digitizes data by performing linear quantization (step 213), and sends linear digitized data to an image coprocessor (step 214). If the control signal is determined to be a machine vision mode control signal, the image sensor performs low resolution capture (step 215), approximate demosaicing by subsampling (step 216), digitizes input data by performing nonlinear quantization (step 217), and sends the nonlinear digitized data to an AI processor (step 218).

Receiving a control signal (step 210) includes receiving, by a controller communicatively coupled to an image sensor, an operating system control signal from an operating system. In some implementations the controller is integrated with the image sensor. The controller can be controller 130 and the image sensor can be image sensor 140 of FIG. 1. Similarly, the operating system can be the operating system 113 of FIG. 1. The operating system control signal may be a photography mode control signal or a machine vision control signal.

Determining an image sensor configuration (211) includes configuring the image sensor to operate in either a photography mode or a machine vision mode based on the operating system control signal. When the operating system control signal is a photography mode control signal, the controller configures the image sensor to perform high resolution capture (step 212), digitize image input data by performing linear quantization (step 213) and send the linear digitized input data to an image coprocessor (Step 214). When the operating system control signal is a machine vision mode control signal, the controller configures the image sensor to perform low resolution capture (step 215), approximate demosaicing by subsampling (step 216), digitize image input data by performing nonlinear quantization (step 217), and send the nonlinear digitized input data to an AI processor (step 218).

Performing high resolution capture (Step 212) includes configuring the image sensor to operate in a high resolution mode. In some implementations, high resolution mode includes causing substantially all amplifiers in a subpixel column to be powered. Thus, the image sensor can capture input image data using substantially all of the subpixels in its subpixel array.

Digitizing input data by performing linear quantization (Step 213) includes configuring the ADC in each subpixel column to digitize the input data by performing linear quantization. In some implementations, each subpixel column includes two ADCs, of which one performs linear quantization. In this instance, digitizing input data by performing linear quantization includes switching to the ADC that performs linear quantization. As the subpixels in each subpixel column sense light in an input image, the subpixels generate continuous analog waveforms that represent input image data. The waveforms are sent through the corresponding column amplifiers to the corresponding column ADCs. When the ADCs are performing linear quantization, the ADCs convert the continuous analog waveforms to digital signals having values linearly proportional to the analog waveform's voltage. In further implementations, the ADC is a SAR ADC. However, the ADC can be other types of ADCs such as a sigma-delta ADC, a flash ADC, a pipeline ADC, or many other ADCs known in the arts.

Sending the linear digitized input data to an image coprocessor (Step 214) includes the controller configuring the image sensor to send the linear digitized input data to an image coprocessor for further processing. In some implementations, the image coprocessor receives the linear digitized input data and performs demosaicing, densoising, color mapping, gamut mapping, tone mapping, and gamma compression using techniques known in the arts.

Performing low resolution capture (step 215) includes configuring the image sensor to operate in a low resolution mode. In some implementations, low resolution mode includes causing amplifiers of less than all subpixel columns to be powered. Thus, the image sensor captures less than all of the input image data because it is using less than all of the subpixels in its subpixel array.

Performing approximate demosaicing by subsampling (step 216) may include configuring the image sensor to subsample the image data. In some implementations, subsampling is accomplished by depowering amplifiers such that readouts of certain subpixels are not obtained. As earlier discussed, in some implementations the controller includes registers for storing image data. Thus, in some implementations, subsampling includes configuring the controller's registers to drop the digital values for specific subpixels. In some implementations, the image data is stored in other types of memory units, which are then configured to drop the digital values for specific subpixels. Performing approximate demosaicing may also include configuring the controller's register, or other types of memory units, to average the digital values of specific groupings of subpixels. Note that, if the image sensor is configured to perform approximate demosaicing on digital values, then performing approximate demosaicing occurs after digitizing image input data, for example, by performing nonlinear quantization (step 280).

Digitizing image input data by performing nonlinear quantization (step 217) includes configuring the ADC's in each column to digitize the input data by performing nonlinear quantization. In some implementations in which there are two ADCs per subpixel column, digitizing by performing nonlinear quantization includes switching to the nonlinear quantizing ADC. When the ADCs receive the waveforms from the pixels, the ADCs perform nonlinear quantization to generate digital signals having values nonlinearly proportional to the received waveform's voltage. Performing nonlinear quantization may include performing logarithmic quantization. In this instance the generated digital signals have values logarithmically proportional to the received waveform's voltage. In some implementations, the ADCs used to perform nonlinear quantization are the same ADCs used to perform linear quantization in Step 216. In this case, configuring the ADCs to perform nonlinear quantization means switching, for example switching between the use of differently configured capacitor banks within the ADCs, the ADCs to perform nonlinear quantization. In some implementations, other ADCs may be used. The ADCs may be SAR ADCs or various other types of ADCs, such as sigma-delta ADCs, flash ADCs, pipelined ADCs, or various other ADCs that can be configured to give a nonlinear response.

Sending the nonlinear digitized input data to an AI processor (step 218) includes the controller configuring the image sensor to send the nonlinear digitized input data to an AI processor for further processing. In some implementations, the AI processor is configured to perform approximate demosaicing. In other implementations, the image sensor is configured to send the nonlinear digitized input data to the processor executing the machine vision application. In this case, the processor may also be configured to perform approximate demosaicing. When the processors are configured to perform approximate demosaicing, the image sensor may be configured to not perform approximate demosaicing.

Figure 3A:
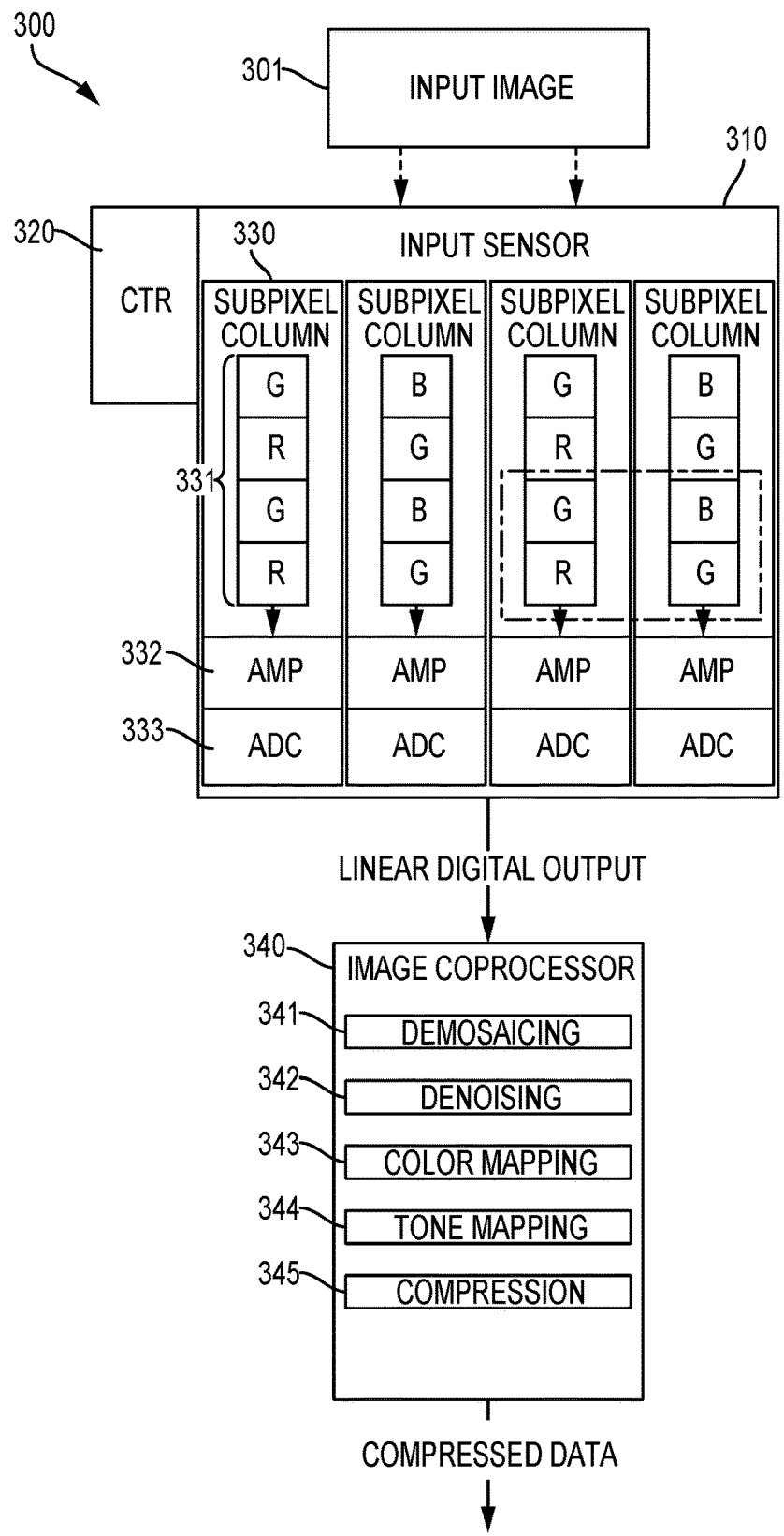
FIG. 3A is a diagram depicting an image pipeline for a configurable image processing system executing a photography application according to exemplary implementations of the present disclosure
Figure 3B:
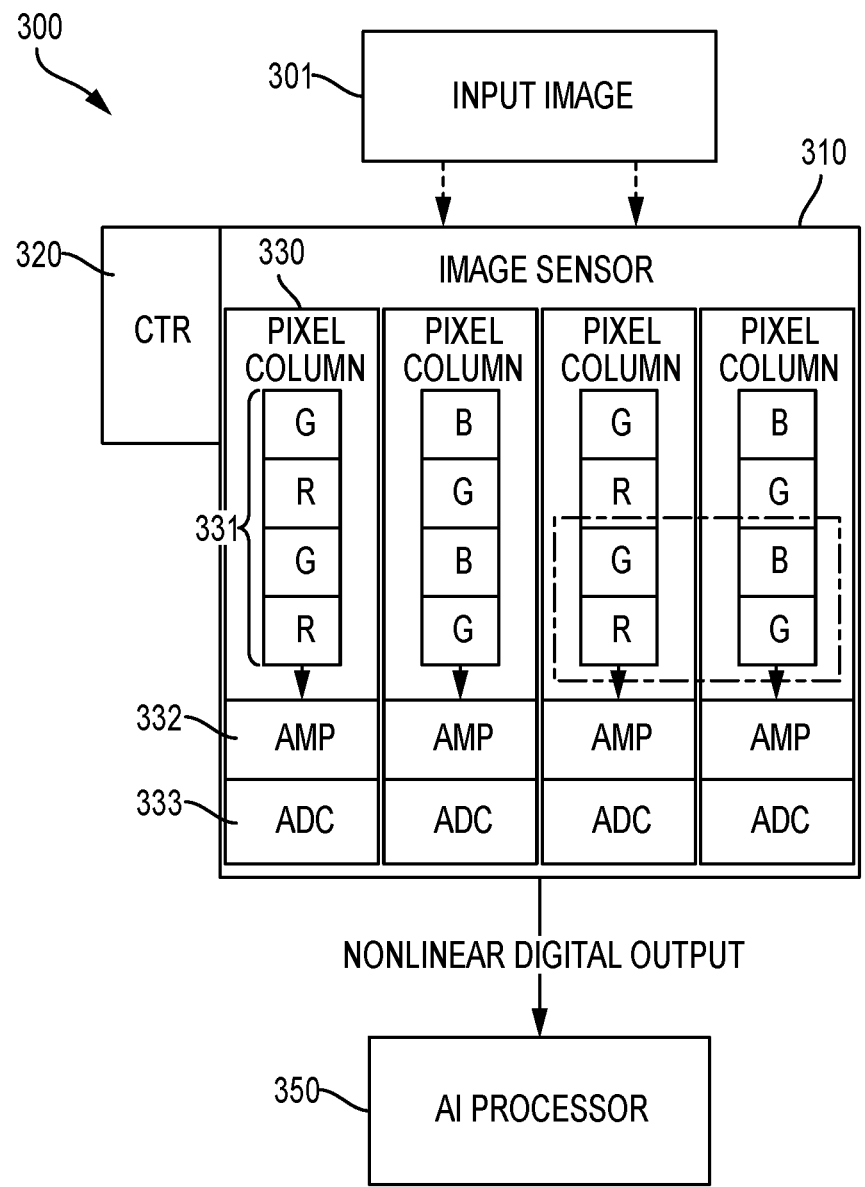
FIG. 3B is a diagram depicting a image pipeline for a configurable image processing system executing a machine vision application according to exemplary implementations of the present disclosure.

FIG. 3A and FIG. 3B are illustrative diagrams depicting a configurable image processing system pipeline. FIG. 3A depicts the configurable image processing pipeline 300 while the system is operating in photography mode, while FIG. 3B depicts the configurable image processing pipeline 300 while the system is operating in machine vision mode. The configurable image processing system pipeline comprises an image sensor 310, image coprocessor 340 and an AI processor 350. In some implementations, these components are connected to a system bus. The image sensor 310 may be the image sensor 140 of FIG. 1, the image coprocessor 340 may be the image coprocessor 150 of FIG. 1, and the AI processor 350 may be the AI processor 160 of FIG. 1. The image sensor 310 is communicatively coupled to image coprocessor 340. The image sensor 310 is also communicatively coupled to the AI processor 350. The image sensor 310 includes a controller 320 and a plurality of subpixel columns 330. The controller 320 is configured to send control signals to various components of the image sensor 310. The controller 320 includes a register for storing image data and configures the image data for further processing. Each subpixel column in the plurality of subpixel columns 330 further includes a plurality of subpixels 331, an amplifier 332 and an ADC 333. In some implementations, the ADC 333 is a SAR ADC, however other ADCs may be used, such as sigma-delta ADCs, flash ADCs or pipelined ADCs. Note that each subpixel column in the plurality of subpixel columns 330 may be similar to the subpixel columns discussed in the FIG. 1 description. The subpixels are arranged in an array of rows and columns within the image sensor 310. Each subpixel in the plurality of subpixels may be configured to detect a specific color. For example, a red subpixel is configured to detect the color red in a corresponding portion of the input image 301. The subpixels may be configured to detect various frequencies on the electromagnetic spectrum. For example, in some implementations, the image sensor 310 includes a combination of red subpixels, blue subpixels, and green subpixels. In some implementations the image sensor 310 includes twice as many green subpixels as red or blue subpixels. For example, the subpixels may be arranged in a Bayer color pattern configuration. However, in some implementations, the image sensor 310 includes a combination of cyan, red, and magenta subpixels. The combination may alternatively include red, green blue and yellow subpixels. The subpixels may also include infrared (IR) or ultraviolet (UV) subpixels, or any combination of the foregoing. In the illustrative examples, the plurality of pixel columns 331 capture the input image 301 and converts it to raw digital data output.

Figure 4A:
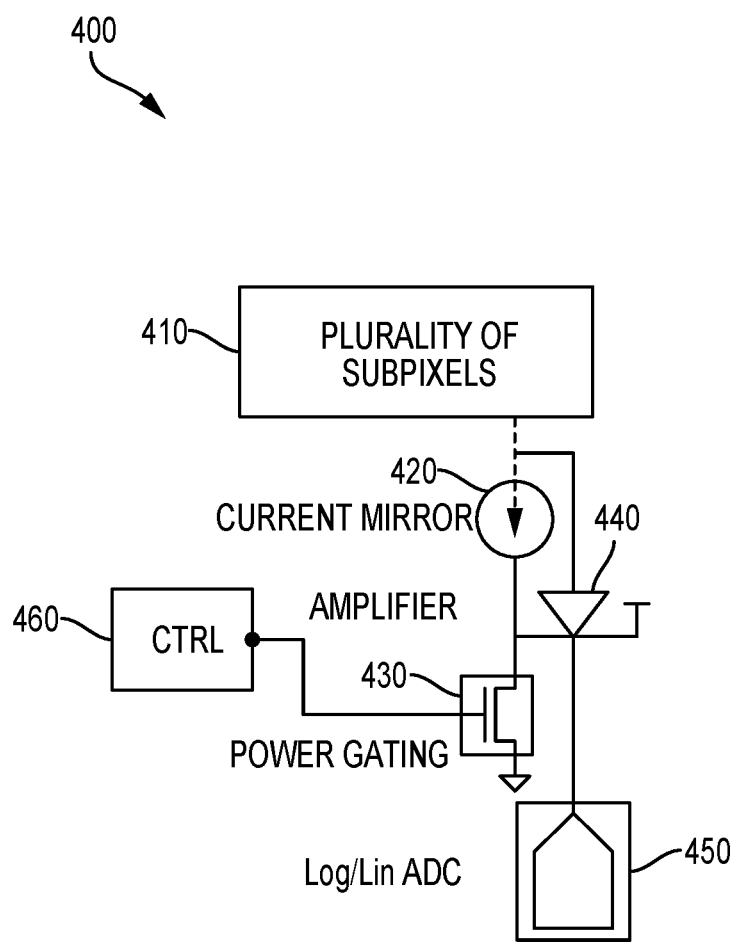
FIG. 4A is a diagram of a subpixel column for a configurable image processing system according to exemplary implementations of the present disclosure

Referring to FIG. 3A, when the image sensor 310 is configured to operate in photography mode, the controller 320 powers all, or substantially all, the amplifiers 332 in the plurality of pixel columns 330. Thus, the input image 301 is captured using all subpixels in the plurality of subpixels 330. FIG. 4A describes this process in more detail. In this instance, the image sensor 310 is said to be operating in high resolution. Furthermore, when the image sensor 310 is configured to operate in photography mode, the plurality of pixel columns 330 are configured to digitize the input image 301 by performing linear quantization to obtain a linearly digitized output. Additionally, when operating in photography mode, the image sensor 310 may send the linear digitized output to the image coprocessor 340 for further processing. The image coprocessor 340 may then perform demosaicing 341, denoising 342, color mapping 343, tone mapping 344, and compression 345 to obtain a photography output using techniques known in the arts. Note that the image coprocessor 340 may be configured to perform just one of these steps, all of these steps, or a combination of these steps. The image coprocessor 340 then sends the photography output to memory for storing.

Referring to FIG. 3B, when the image sensor 310 is configured to operate in machine vision mode, the controller 320 powers the amplifiers 332 in less than all of the subpixel columns in the plurality of subpixel columns 330. Thus, the plurality of subpixel columns 330 capture less than the entire input image 301. In this instance, the image sensor 310 is said to be operating in low resolution. Any number of amplifiers may be depowered to generate the desired lower resolution. For example, in some implementations, one-fourth of the amplifiers 332 are powered. In some implementations, one-third of the amplifiers 333 are powered. For example, in some implementations, the controller 320 only powers amplifiers corresponding to the columns of every third set of subpixels that together correspond to a given pixel. In some implementations, controller 320 only powers amplifiers corresponding to the columns of every fourth set of subpixel that together correspond to a given pixel. Accordingly, the image sensor 310 may only provide image data for one-third or one-fourth of its total possible pixel resolution. When operating in machine vision mode, the image sensor 310 is further configured to perform approximate demosaicing by subsampling the input image 301. Furthermore, while the image sensor 310 is configured to operate in machine vision mode, the plurality of pixel columns 330 is further configured to digitize the input image 301 by performing nonlinear quantization to obtain a nonlinear digital output. In some implementations, performing nonlinear quantization includes logarithmic quantization. Additionally, when the image sensor 310 is configured to operate in machine vision mode, the image coprocessor 340 may be disabled. The image sensor 310 is then configured to send the nonlinear digital output to the AI processor 350. Note that the AI processor 350 is optional and in some implementations the image sensor 310 is configured to send the digital output to a central processor similar to processor 120 of FIG. 1, for machine vision processing.

As discussed earlier, the image sensor 310 can be configured to subsample the input image 301. Subsampling the input image 301 can include depowering certain amplifiers 333 during readout of specific subpixels. For example, referring to FIG. 3B, amplifiers 333 may be depowered during the readout of every other subpixel in the plurality of subpixels 330. Subsampling may alternatively include dropping the digital values of specified subpixels at the controller's 320 register. Performing approximate demosaicing may also include configuring the controller 320 to average certain groupings of subpixels.

In some implementations, the plurality of subpixels 331 can be configured to sense various combinations of light frequencies on the electromagnetic spectrum. For example, the plurality of pixels may be arranged in a Bayer color pattern. This is a pattern known in the arts wherein the subpixel array consist of 2×2 blocks consisting of one red subpixel, one blue subpixel and two green subpixels. For illustrative purposes, FIGS. 3A and 3B show this arrangement within the dotted box, where the letters R, B, and G represent red subpixels, blue subpixels and green subpixels respectively. However, the plurality of subpixels 331 may include many numerical arrangements of various color subpixels or other light frequencies on the electromagnetic spectrum such as IR or UV light. Note that for the purposes of this illustration, the subpixels are arranged in a 2×2 array. This is merely to simplify this description. The array can be any dimensional configuration. For example, commercial cameras that implement a 720p resolution are configured in a 1280×720 pixel array, wherein the pixels further include 2×2 blocks of subpixels. When the pluralities of subpixels 331 are arranged in a bayer color pattern, subsampling may include depowering amplifiers 333 as readout occurs for every other green subpixel. Thus, readout is not obtained for one green subpixel in every bayer color pattern block. Alternatively, sub sampling may include dropping the value of one green pixel for every 2×2 subpixel block at the controller's 320 registers. In some implementations, approximate demosaicing includes summing the values of the two green pixels and dividing the sum by two at the controller 320.

The configuration of the image pipeline offers many advantages over existing designs. For one, image sensor 310 can be configured to operate in both low resolution mode and high resolution mode depending on the application requirements. Many computer vision applications may not need the same image quality as photography applications to perform computer vision tasks. That is to say, implementing many of the image processing steps that many digital cameras utilize may not be necessary when capturing image data for use in computer vision applications. Consequently, the system can lower processing power, and therefore power consumption and processing time, by switching the image sensor 310 to operate in a lower resolution mode when capturing images for computer vision tasks without having a substantial effect on vision accuracy. Also, by performing approximate demosaicing, the configurable image system is able to replace the demosaicing steps by approximating the function of traditional demosaicing techniques. For example, a demosaicing technique known in the arts includes generating a pixel having a value for each color for each subpixel by interpolating the values from adjacent subpixels. However, computer vision programs typically do not need this amount of information regarding the input image. Thus, approximate demosaicing accomplishes similar goals as traditional demosaicing techniques, which is to say it produces pixels having a single value for each color, but it preserves less information regarding the input image. This allows the system to capture an amount of image information sufficient to permit accurate machine vision processing while providing further power savings to the system.

As discussed above, the image sensor 310 can be configured to perform both linear and nonlinear quantization depending on the application requirements. Nonlinear quantization increases power savings by reducing the number of bits used to capture sufficient image data. A typical linear ADC's power requirements are exponential based on the number of bits in its output. For example, a 12-bit ADC requires twice as much power as an 11-bit ADC. Performing nonlinear quantization allows the image sensor 310 to capture a sufficient amount of image information using fewer bits, a goal traditionally accomplished by gamma compression in typical image processors. Furthermore, performing nonlinear quantization may aid machine vision processing accuracy. For example, logarithmic quantization may be preferred for representing images because image light intensities are not uniformly distributed. Namely, the probability distribution functions for light intensities in natural images are log-normal. To preserve information about the analog signal, the ADC 333 can use quantization levels that map the light intensities uniformly among digital values. By, configuring the image system to approximate the demosaicing techniques and gamma compression techniques in typical image processing systems, the configurable image processing system carries out the more important image processing techniques that preserve vision accuracy. That is to say, the demosaicing and gamma compression techniques implemented by many commercial image processors have the most influence on computer vision accuracy, while the other techniques such as tone mapping may have less influence on computer vision accuracy. Thus, the configurable image processing system facilitates power efficiency by configuring the image pipeline to approximate the more important image processing techniques needed for accurate computer vision while essentially skipping the less important techniques.

Figure 4B:
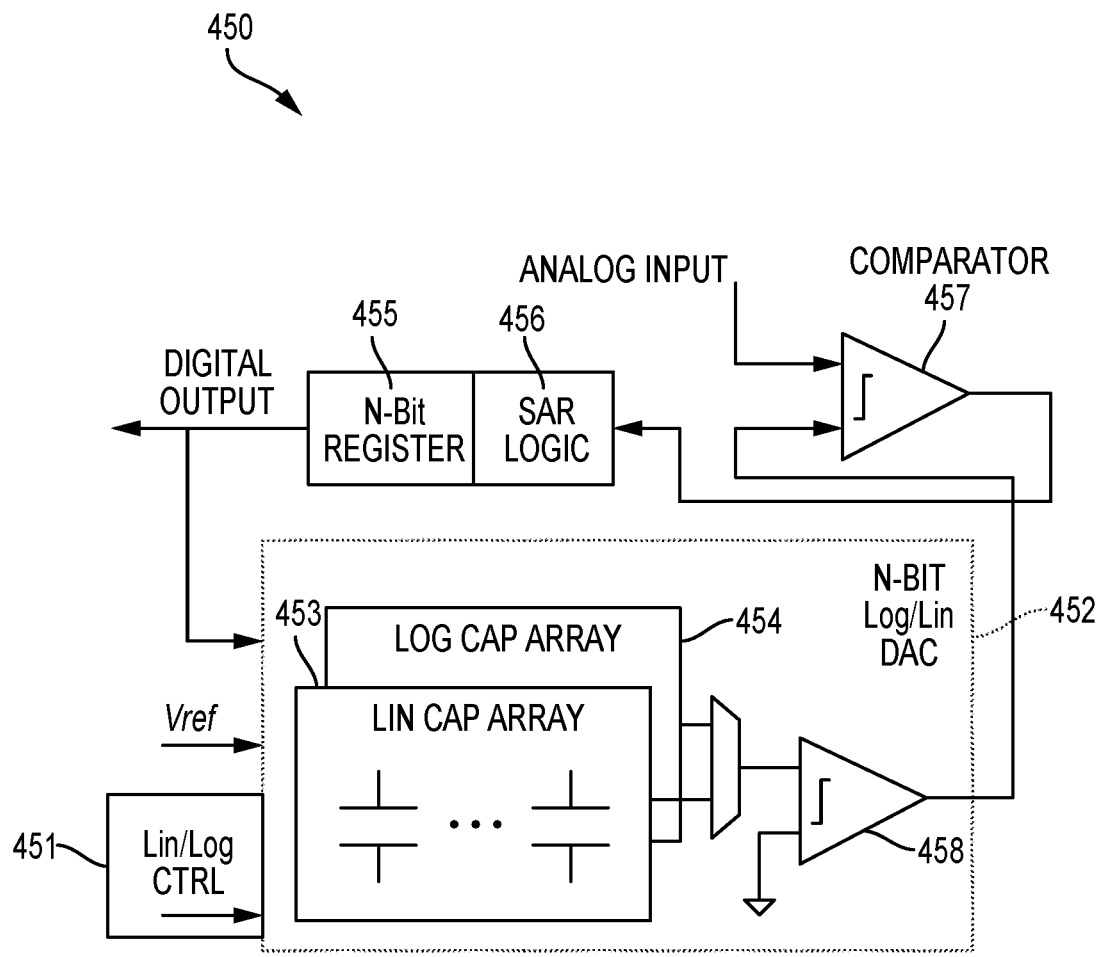
FIG. 4B is a diagram of a successive-approximate register analog-to-digital converter for a configurable image processing system according to exemplary implementations of the present disclosure

FIG. 4A is a circuitry diagram of a subpixel column 400 communicatively coupled to a controller 460. The subpixel column 400 may be a subpixel column in the plurality of subpixel columns 330 of FIG. 3. Thus, an image sensor, such as image sensor 310 of FIG. 3, can include several subpixel columns 400. The controller 460 can be controller 130 of FIG. 1 or controller 320 of FIG. 3. The subpixel column 400 includes a plurality of subpixels 410, a current mirror 420, an amplifier 440, a switch 430, and an ADC 450. In some implementations, the switch 430 is a transistor. The ADC 450 is a SAR ADC configured to perform both linear and logarithmic quantization depending on the operational mode. However other ADCs may be used. For example, in some implementations a sigma-delta ADC is used. In other implementations, a pipelined ADC is used. For illustrative purposes, the subpixels making up the plurality of subpixels 410 are part of a Bayer color pattern array of subpixels, and thus include red subpixels, blue subpixels and green subpixels. However, the plurality of subpixels can include many combinations of various subpixels configured to detect other light frequencies on the electromagnetic spectrum. FIG. 4B is a circuit diagram depicting an example of the ADC 450. The ADC 450 includes comparators 457 and 458, a SAR Logic component 456, an N-bit Register component 457, a lin/log control 451, and a SAR DAC 452 (digital-to-analog converter). SAR DAC 452 further includes a logarithmic capacitor array (log cap array) 454 and a linear capacity array (lin cap array) 453.

Referring back to FIG. 4A, the controller 460 controls the switch 430. When the image sensor is configured to operate in photography mode, the controller 460 powers the amplifiers 440 in every subpixel column by controlling switch 430. The current mirror 420 provides Gaussian weights from the waveforms generated by the plurality of subpixels 410. Furthermore, the controller 460 causes the ADC 450 to perform linear quantization. When the image sensor is configured to operate in machine vision mode, the controller 460 powers the amplifiers 440 in less than substantially all of the subpixel columns 410. In this case, the image sensor is operating at a lower resolution. Also, the controller 460 causes the ADC 450 to perform nonlinear quantization.

Referring to FIG. 4B, ADC 450 is a SAR ADC known in the arts, except that it is configured to perform both linear quantization and logarithmic quantization. The ADC 450 converts the analog waveform from the pixels into digital signals by using a reference voltage to perform a binary search through all possible quantization levels. The controller 460 controls the log/lin ctrl 451 to apply a voltage reference to the lin cap array 453 and the log cap array 454 depending on the mode of operation. In photography mode, the log/lin control 451 applies a voltage reference to the lin cap array 453. The lin cap array 453 includes an array of contact nodes configured to provide reference signals that facilitate linear quantization. In machine vision mode, the log/lin control 4451 applies a voltage reference to the log cap array 454. The log cap array 454 includes an array of contact nodes configured to provide reference signals that facilitate logarithmic quantization.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

The invention claimed is:

1. A configurable image processing system comprising:
at least one image sensor configured to operate in a machine vision mode and a photography mode in response to an operating system command, wherein the at least one image sensor is configured to send image data to a first processor while operating in machine vision mode, and further configured to send image data to an image coprocessor when operating in photography mode,
wherein operating in machine vision mode includes digitizing input image data by performing nonlinear quantization and operating in photography mode includes digitizing input image data by performing linear quantization.

2. The system of claim 1, wherein performing nonlinear quantization includes performing logarithmic quantization.

3. The system of claim 1, wherein the image coprocessor is configured to perform demosaicing, denoising, color mapping, tone mapping, and compression, or a combination thereof.

4. The system of claim 1, wherein the first processor comprises an artificial intelligence processor.

5. The system of claim 1, wherein the first processor comprises a central processing unit.

6. A configurable image processing system comprising:
at least one image sensor configured to operate in a machine vision mode and a photography mode in response to an operating system command, wherein the at least one image sensor is configured to send image data to a first processor while operating in machine vision mode, and further configured to send image data to an image coprocessor when operating in photography mode,
wherein operating in machine vision mode includes performing approximate demosaicing, and
wherein performing approximate demosaicing includes subsampling the input image data.

7. A configurable image processing system comprising:
at least one image sensor configured to operate in a machine vision mode and a photography mode in response to an operating system command, wherein the at least one image sensor is configured to send image data to a first processor while operating in machine vision mode, and further configured to send image data to an image coprocessor when operating in photography mode,
wherein the image sensor further comprises a plurality of subpixel columns, each subpixel column in the plurality of subpixel columns comprising a plurality of subpixels, at least one analog-to-digital converter, at least one amplifier, and at least one switch.

8. The system of claim 7, wherein the at least one analog-to-digital converter is a successive approximation analog-to-digital converter.

9. The system of claim 7, wherein the at least one analog-to-digital converter is configured to perform linear quantization when the image sensor is operating in photography mode, and perform logarithmic quantization when the image sensor is operating in machine vision mode.

10. A method of operating a configurable image processing system for multiple applications comprising:
receiving, by an image sensor, instructions to operate in either a photography mode or a machine vision mode;
in response to receiving instructions to operate in a photography mode, capturing, by the image sensor, image data and sending the image data to an image coprocessor for image processing; and
in response to receiving instructions to operate in a machine vision mode, capturing, by the image sensor, image data and sending the image data to a first processor for image processing, wherein in response to receiving instructions to operate in a photography mode, the image sensor digitizes the image data using linear quantization, and in response to receiving instructions to operate in a machine vision mode, the image sensor digitizes the image data using logarithmic quantization.

11. A method of operating a configurable image processing system for multiple applications comprising:
receiving, by an image sensor, instructions to operate in either a photography mode or a machine vision mode;
in response to receiving instructions to operate in a photography mode, capturing, by the image sensor, image data and sending the image data to an image coprocessor for image processing; and in response to receiving instructions to operate in a machine vision mode, capturing, by the image sensor, image data and sending the image data to a first processor for image processing, wherein in response to receiving instructions to operate in a machine vision mode, the image sensor executes approximate demosaicing on the image data, and wherein executing approximate demosaicing includes sub-sampling the image data.

12. A method for operating a configurable image processing system for multiple applications comprising:

determining, by an operating system executing on processor first processor, whether an image capture application executing on the processor comprises a photography application or a machine vision application;

in response to determining that the image capture application comprises a photography application, sending, by the operating system, a photography mode control signal to an image sensor controller, and receiving by the operating system image data from an image coprocessor after the image coprocessor has processed image data captured by the image sensor in response to receiving the photography mode control signal;

in response to determining that the image capture application comprises a machine vision application:

sending, by the operating system, a machine vision mode control signal to the image sensor controller; and receiving by the operating system image data captured by the image sensor in response to the machine vision control mode control signal without such image data being processed by the image coprocessor, wherein the image data received by the operating system, in response to determining the application comprises a machine vision application, comprises non-linearly quantized image data, and the image data received by the operating system in response to determining the application comprises a photography application comprises linearly quantized image data.

13. The method of claim 12, wherein in response to determining that the image capture application comprises a machine vision application, the operating system sends a power-down control signal to the image coprocessor.

14. The method of claim 12, wherein in response to determining that the image capture application comprises a machine vision application, the operating system sends the received image data to an artificial intelligence coprocessor.

15. The method of claim 12, wherein in response to determining that the image capture application comprises a machine vision application, the operating system passes the received image data to the machine vision application.

16. The method of claim 12, wherein the image data received by the operating system, in response to determining the application comprises a machine vision application, comprises lower resolution image data than the image data received by the operating system in response to determining the application comprises a photograph application.

* * * * *

UNITED STATES PATENT AND TRADEMARK OFFICE
CERTIFICATE OF CORRECTION

PATENT NO. : 10,735,675 B2
APPLICATION NO. : 15/952719
DATED : August 4, 2020
INVENTOR(S) : Mark Buckler et al.

It is certified that error appears in the above-identified patent and that said Letters Patent is hereby corrected as shown below:

In the Claims

Column 17, Lines 14-15 Claim 12 should read:
determining, by an operating system executing on "pro-
cessor" a first processor, whether an image capture appli- Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*